United States Patent
Park et al.

(10) Patent No.: US 9,264,206 B2
(45) Date of Patent: Feb. 16, 2016

(54) SIGNAL TRANSMISSION AND RECEPTION METHOD USING RANDOM BEAMFORMING IN WIRELESS COMMUNICATION SYSTEM AND APPARATUS THEREFOR

(71) Applicant: LG ELECTRONICS INC., Seoul (KR)

(72) Inventors: Jonghyun Park, Anyang-si (KR); Byounghoon Kim, Anyang-si (KR); Sukho Shin, Seoul (KR); Wonjin Sung, Seoul (KR); Jaewon Kim, Gimpo-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 158 days.

(21) Appl. No.: 14/066,302

(22) Filed: Oct. 29, 2013

(65) Prior Publication Data

US 2014/0119301 A1      May 1, 2014

Related U.S. Application Data

(60) Provisional application No. 61/719,962, filed on Oct. 30, 2012.

(51) Int. Cl.
*H04L 5/00*      (2006.01)

(52) U.S. Cl.
CPC .................................... *H04L 5/0091* (2013.01)

(58) Field of Classification Search
None
See application file for complete search history.

(56) References Cited

U.S. PATENT DOCUMENTS

| | | | |
|---|---|---|---|
| 2009/0080560 A1* | 3/2009 | Na et al. | 375/267 |
| 2009/0179797 A1* | 7/2009 | Kwon et al. | 342/368 |
| 2010/0118989 A1* | 5/2010 | Sayana et al. | 375/260 |
| 2010/0195615 A1* | 8/2010 | Lee et al. | 370/330 |
| 2012/0039298 A1* | 2/2012 | Lee et al. | 370/330 |
| 2012/0076039 A1* | 3/2012 | Kwon et al. | 370/252 |
| 2012/0114021 A1* | 5/2012 | Chung et al. | 375/211 |

FOREIGN PATENT DOCUMENTS

WO    WO /2011/090353    *    7/2011    .............. H04B 7/04

* cited by examiner

*Primary Examiner* — Jeffrey M Rutkowski
*Assistant Examiner* — Ning Li
(74) *Attorney, Agent, or Firm* — Dentons US LLP

(57) ABSTRACT

A method for transmitting a signal to a user equipment by a base station in a wireless communication system is disclosed. The method includes receiving information about a preferred beamforming vector in a first subframe from the user equipment, selecting a first random beamformer corresponding to the first subframe from a beamforming vector set for the first subframe, using the information about the preferred beamforming vector, transmitting a downlink signal to the user equipment in the first subframe using the first random beamformer, selecting a second random beamformer corresponding to a second subframe, using the first random beamformer, and transmitting a downlink signal to the user equipment in the second subframe using the second random beamformer.

7 Claims, 21 Drawing Sheets

FIG. 2
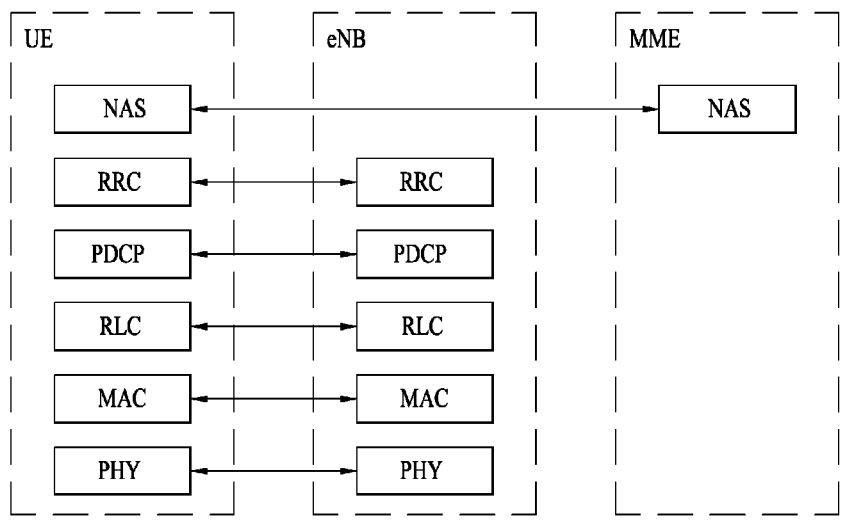
(a) CONTROL-PLANE PROTOCOL STACK
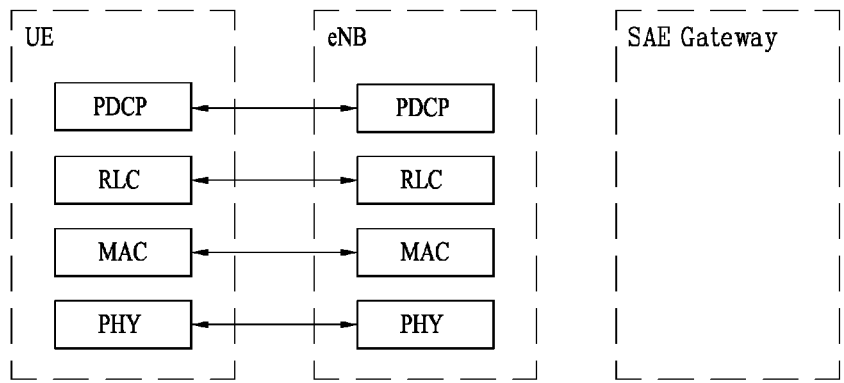
(b) USER-PLANE PROTOCOL STACK FIG. 15
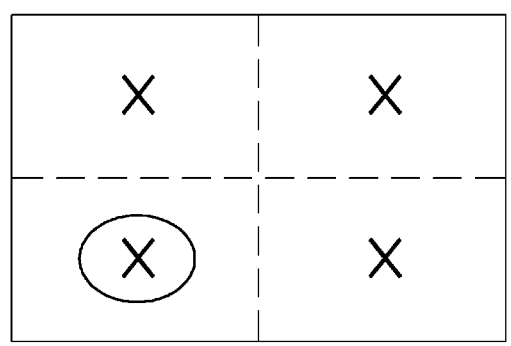
(a)
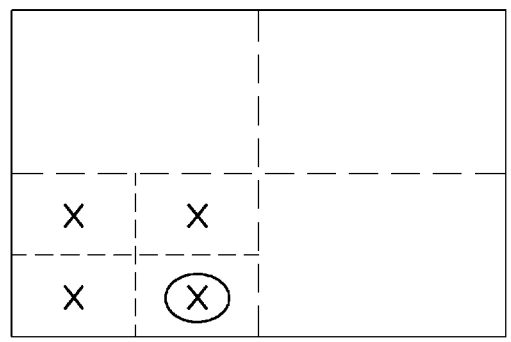
(b)

FIG. 16

|  | $V_1$ | $V_2$ | $V_3$ | $V_4$ | ... | $V_N$ |
|---|---|---|---|---|---|---|
| $C_1$ | 4.71 | 4.71 | 4.71 | 4.71 | 4.71 | 4.71 |
| $C_2$ | 4.71 | 4.71 | 4.71 | 4.71 | 4.71 | 4.71 |
| $C_3$ | 4.71 | 4.71 | 4.71 | 4.71 | 4.71 | 4.71 |
| $C_4$ | 4.71 | 4.71 | 4.71 | 4.71 | 4.71 | 4.71 |

FIG. 17

● Scheduling and RVA port allocation
○ RVA port allocation

1st subframe

| RVA port index | 1 | 2 | 3 | 4 |
|---|---|---|---|---|
| ● $UE_1$ feedback information | 2.83 | 4.40 | 0.62 | 0.43 |
| $UE_2$ feedback information | 1.08 | 0.56 | 0.03 | 0.47 |
| $UE_3$ feedback information | 1.66 | 0.91 | 1.81 | 0.62 |
| $UE_4$ feedback information | 0.02 | 0.16 | 0.91 | 0.16 |
| $UE_5$ feedback information | 0.63 | 2.10 | 0.01 | 2.30 |
| $UE_6$ feedback information | 0.81 | 1.35 | 1.23 | 0.22 |
| ● $UE_7$ feedback information | 0.47 | 0.46 | 0.17 | 3.49 |
| $UE_8$ feedback information | 0.28 | 0.27 | 1.23 | 0.30 |
| $UE_9$ feedback information | 0.79 | 1.58 | 1.54 | 2.41 |
| $UE_{10}$ feedback information | 3.86 | 0.48 | 1.31 | 2.37 |
| ● $UE_{11}$ feedback information | 5.39 | 3.30 | 2.31 | 3.18 |
| ● $UE_{12}$ feedback information | 0.33 | 1.15 | 2.42 | 0.68 |
| SLR (x/y) | 0.33 | 1.15 | 2.42 | 0.68 |

FIG. 19

Scheduling and RVA port allocation ●
RVA port allocation ○

| RVA port index | 1st subframe | | | | 2nd subframe | | | |
|---|---|---|---|---|---|---|---|---|
| | 1 | 2 | 3 | 4 | 5 | 6 | 7 | 8 |
| UE$_1$ feedback information | 2.83 | 4.40 | 0.62 | 0.43 | 0.39 | | 1.66 | 0.03 |
| UE$_2$ feedback information | 1.08 | 0.56 | 0.03 | 0.47 | 0.05 | | 0.45 | 1.07 |
| UE$_3$ feedback information | 1.66 | 0.91 | 1.81 | 0.62 | 0.11 | | 2.97 | 0.05 |
| UE$_4$ feedback information | 0.02 | 0.16 | 0.91 | 0.16 | 0.43 | | 0.30 | 0.41 |
| UE$_5$ feedback information | 0.63 | 2.10 | 0.01 | 2.30 | 0.10 | | 2.25 | 3.82 |
| UE$_6$ feedback information | 0.81 | 1.35 | 1.23 | 0.22 | 0.50 | | 0.01 | 0.43 |
| UE$_7$ feedback information | 0.47 | 0.46 | 0.17 | 3.49 | 0.06 | | 1.82 | 0.09 |
| UE$_8$ feedback information | 0.28 | 0.27 | 1.23 | 0.30 | 0.34 | | 2.39 | 1.72 |
| UE$_9$ feedback information | 0.79 | 1.58 | 1.54 | 2.41 | 1.09 | | 0.07 | 1.48 |
| UE$_{10}$ feedback information | 3.86 | 0.48 | 1.31 | 2.37 | 0.35 | | 5.39 | 2.70 |
| UE$_{11}$ feedback information | 5.39 | 3.30 | 2.31 | 3.18 | 0.38 | | 1.98 | 1.72 |
| UE$_{12}$ feedback information | 0.33 | 1.15 | 2.42 | 0.68 | 0.45 | | 1.18 | 0.42 |
| SLR (x/y) | 0.33 | 1.15 | 2.42 | 0.68 | 0.35 | N/A | 0.36 | 0.38 |

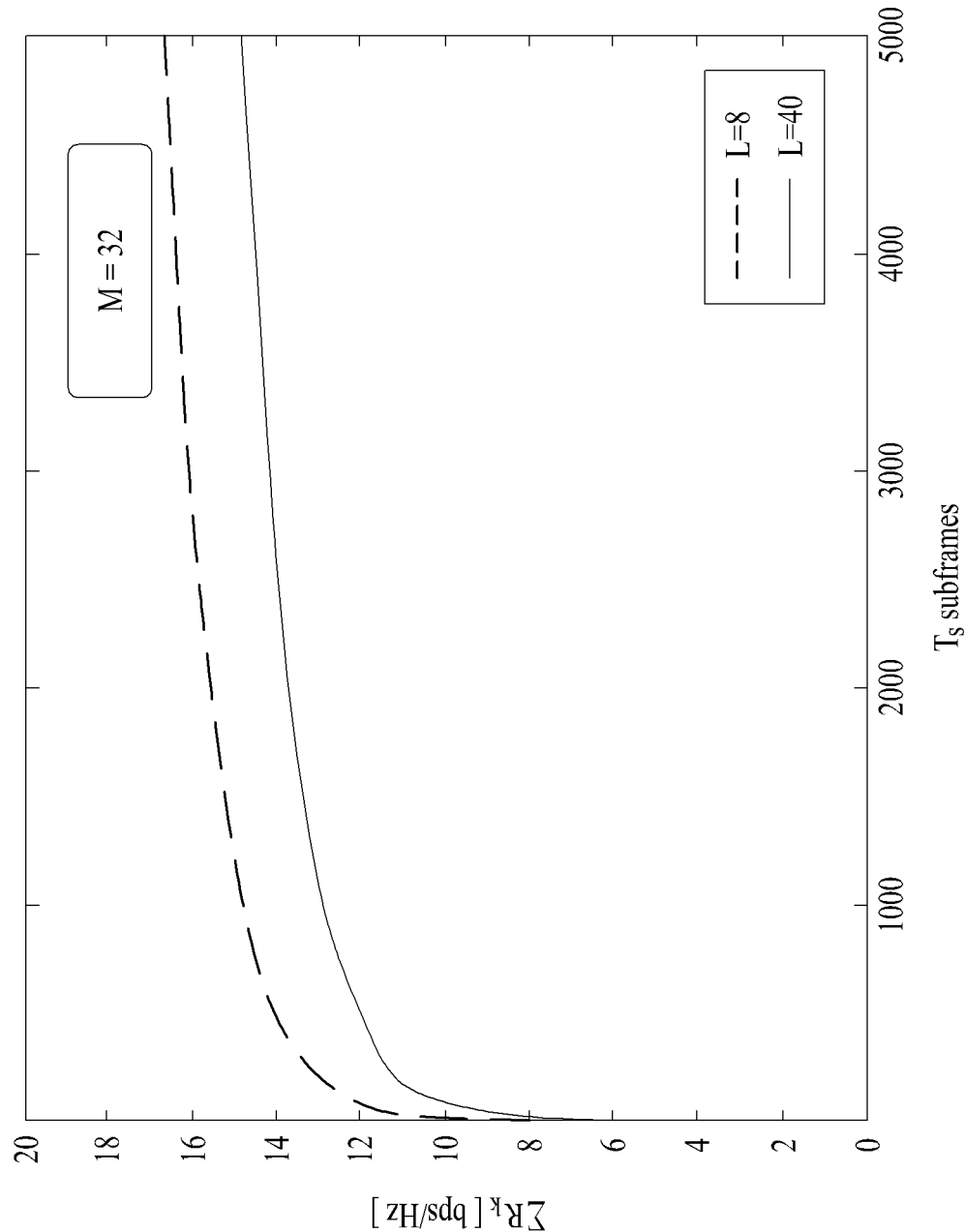

FIG. 23

2$^{nd}$ subframe

| RVA port index | 1 | 2 | 3 | 4 |
|---|---|---|---|---|
| UE$_1$ feedback information | 0.59 | 0.65 | 0.48 | 0.18 |
| UE$_2$ feedback information | 0.01 | 0.07 | 0.62 | 0.23 |
| UE$_3$ feedback information | 0.07 | 0.31 | 0.35 | 0.31 |
| UE$_4$ feedback information | 1.15 | 1.19 | 0.35 | 0.19 |
| SLR (x/y) | 1.15 | 1.19 | 0.35 | 0.19 |

⟹ UE$_1$ → c$_{4'}$ = v$_{571}$

2$^{nd}$ subframe

| RVA port index | 5 | 6 | 7 | 8 |
|---|---|---|---|---|
| UE$_1$ feedback information | 0.31 | 0.12 | 0.48 | 0.73 |
| UE$_2$ feedback information | 0.49 | 0.22 | 0.05 | 1.02 |
| UE$_3$ feedback information | 0.11 | 0.04 | 0.10 | 0.02 |
| UE$_4$ feedback information | 0.12 | 0.66 | 0.29 | 0.12 |
| SLR (x/y) | 0.90 | 0.27 | 0.05 | 1.19 |

⟹ UE$_2$ → c$_8$ = v$_{379}$

2$^{nd}$ subframe

| RVA port index | 9 | 10 | 11 | 12 |
|---|---|---|---|---|
| UE$_1$ feedback information | 0.04 | 0.55 | 0.51 | 0.11 |
| UE$_2$ feedback information | 0.33 | 0.77 | 0.06 | 0.10 |
| UE$_3$ feedback information | 0.50 | 0.29 | 0.09 | 0.05 |
| UE$_4$ feedback information | 0.01 | 0.42 | 0.12 | 0.15 |
| SLR (x/y) | 1.30 | 0.17 | 0.12 | 0.15 |

⟹ UE$_3$ → c$_9$ = v$_{898}$

2$^{nd}$ subframe

| RVA port index | 13 | 14 | 15 | 16 |
|---|---|---|---|---|
| UE$_1$ feedback information | 0.03 | 0.52 | 0.57 | 0.10 |
| UE$_2$ feedback information | 0.65 | 0.79 | 0.29 | 0.30 |
| UE$_3$ feedback information | 0.18 | 0.31 | 0.15 | 0.35 |
| UE$_4$ feedback information | 0.84 | 0.46 | 0.14 | 0.52 |
| SLR (x/y) | 0.97 | 0.29 | 0.13 | 0.69 |

⟹ UE$_4$ → c$_{13}$ = v$_{713}$

SIGNAL TRANSMISSION AND RECEPTION METHOD USING RANDOM BEAMFORMING IN WIRELESS COMMUNICATION SYSTEM AND APPARATUS THEREFOR

This application claims the benefit of U.S. Provisional Application No. 61/719,962, filed on Oct. 30, 2012, which is hereby incorporated by reference as if fully set forth herein.

BACKGROUND OF THE INVENTION

1. Field of the Invention

The present invention relates to a wireless communication system, and more particularly, to a signal transmission and reception method using random beamforming in a wireless communication system and an apparatus therefor.

2. Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. The E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain within which data is to be transmitted, coding, data size, and hybrid automatic repeat and request (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

SUMMARY OF THE INVENTION

Accordingly, the present invention is directed to a signal transmission and reception method using random beamforming in a wireless communication system and an apparatus therefor that substantially obviate one or more problems due to limitations and disadvantages of the related art.

In accordance with an embodiment of the present invention, a method for transmitting a signal to a user equipment by a base station in a wireless communication system includes receiving information about a preferred beamforming vector in a first subframe from the user equipment, selecting a first random beamformer corresponding to the first subframe from a beamforming vector set for the first subframe, using the information about the preferred beamforming vector, transmitting a downlink signal to the user equipment in the first subframe using the first random beamformer, selecting a second random beamformer corresponding to a second subframe, using the first random beamformer, and transmitting a downlink signal to the user equipment in the second subframe using the second random beamformer.

The method may further include configuring the beamforming vector set for the first subframe, consisting of beamforming vectors as much as a number of virtual antennas of the base station and transmitting information about the beamforming vector set for the first subframe to the user equipment, wherein the beamforming vectors included in the beamforming vector set for the first subframe correspond respectively to the virtual antennas of the base station.

The information about the preferred beamforming vector may be information about one of the beamforming vectors included in the beamforming vector set for the first subframe.

The selection of the second random beamformer corresponding to the second subframe may include configuring a beamforming vector set for the second subframe, consisting of beamforming vectors as much as a number of virtual antennas of the base station, transmitting information about the beamforming vector set for the second subframe to the user equipment, and receiving information about a preferred beamforming vector in the second subframe from the user equipment, wherein the beamforming vectors included in the beamforming vector set for the second subframe correspond respectively to the virtual antennas of the base station.

The virtual antennas of the base station may include one or more antenna ports. The method may further include transmitting information about a reference signal defining the virtual antennas to the user equipment. The information about the reference signal may include at least one of information about the number of the virtual antennas, information about resource configuration of the reference signal, and information about a sequence scrambling seed of the reference signal.

In accordance with another embodiment of the present invention, a base station in a wireless communication system includes a radio communication module for transmitting and receiving a signal to and from a user equipment and a processor for processing the signal, wherein the processor controls the radio communication module to select a first random beamformer corresponding to a first subframe from a beamforming vector set for the first subframe, using information about a preferred beamforming vector in the first subframe received from the user equipment and to transmit a downlink signal to the user equipment in the first subframe using the first random beamformer, and controls the radio communication module to select a second random beamformer corresponding to a second subframe, using the first random beamformer and to transmit a downlink signal to the user equipment in the second subframe using the second random beamformer.

The processor may configure the beamforming vector set for the first subframe, consisting of beamforming vectors as much as a number of virtual antennas of the base station, and beamforming vectors included in the beamforming vector set for the first subframe may correspond respectively to the virtual antennas of the base station.

The processor may configure a beamforming vector set for the second subframe, consisting of beamforming vectors as much as a number of virtual antennas of the base station, and the beamforming vectors included in the beamforming vector set for the second subframe may correspond respectively to the virtual antennas of the base station.

The virtual antennas of the base station may include one or more antenna ports. The processor may control the radio communication module to transmit information about a reference signal defining the virtual antennas to the user equipment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a view illustrating structures of a control plane and a user plane of a radio interface protocol between a UE and an E-UTRAN based on the 3GPP radio access network specification;

FIG. 15 is a view illustrating a scheme for generating a random beamformer of a hierarchical structure according to an embodiment of the present invention;

FIG. 16 illustrates an example of region determination according to correlation between a centroid vector and a random beamformer;

FIGS. 17 to 19 illustrate algorithms for selecting a UE using an SLR according to an embodiment of the present invention;

FIG. 20 is a view illustrating performance evaluation according to the number of RVA ports and the number of subframes when the present invention is applied;

FIG. 23 illustrates a process of searching for a beamformer, which is more suitable for a UE, using a new RVA port selected based on a UE selected through a primary RVA port using a hierarchical structure;

DETAILED DESCRIPTION OF THE INVENTION

Figure 1:
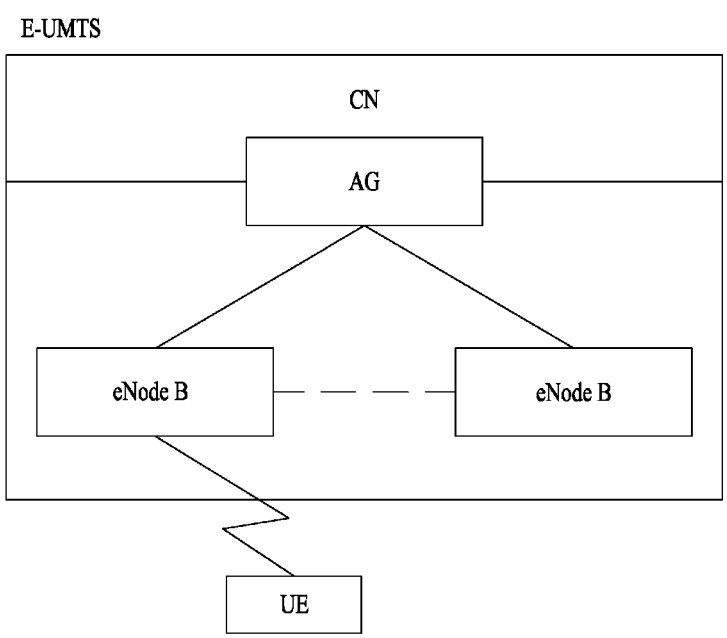
FIG. 1 is a view schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-Advanced (LTE-A) system, the LTE system and the LTE-A system are purely exemplary and the embodiments of the present invention can be applied to any communication system corresponding to the aforementioned definition. In addition, although the embodiments of the present invention will be described based on FDD mode, the FDD mode is purely exemplary and the embodiments of the present invention can easily be applied to H-FDD mode or TDD mode.

Moreover, the term Base Station (BS) may refer to a Remote Radio Head (RRH), an eNB, a Transmission Point (TP), a Reception Point (RP), a relay, etc.

FIG. 2 is a view illustrating structures of a control plane and a user plane of a radio interface protocol between a UE and an E-UTRAN based on 3GPP radio access network specifications. The control plane refers to a path used for transmission of control messages, which are used by the UE and the network to manage a call. The user plane refers to a path used for transmitting data generated in an application layer, e.g. voice data or Internet packet data.

A physical layer of a first layer provides an information transfer service to an upper layer using a physical channel. The physical layer is connected to a Media Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

The MAC layer of a second layer provides a service to a Radio Link Control (RLC) layer of an upper layer via a logical channel. The RLC layer of the second layer supports reliable data transmission. The function of the RLC layer may be implemented by a functional block within the MAC layer. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
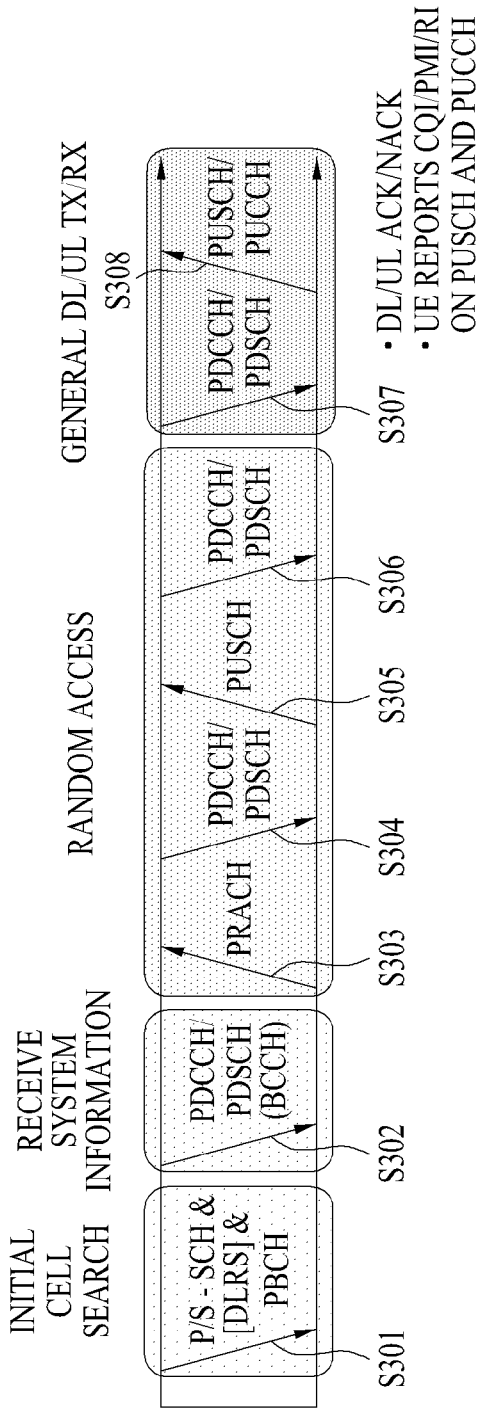
FIG. 3 is a view illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink acknowledgment/Negative acknowledgment (ACK/NACK) signal, a Channel Quality Indicator (CQI), a Precoding Matrix Index (PMI), a Rank Indicator (RI), and the like. In the case of a 3GPP LTE system, the UE may transmit the control information such as CQI/PMI/RI through the PUSCH and/or the PUCCH.

Figure 4:
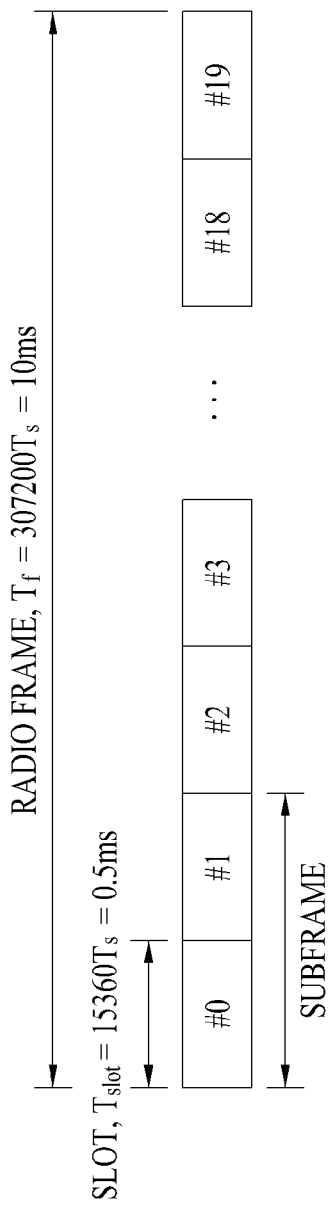
FIG. 4 is a view illustrating the structure of a radio frame used in an LTE system.

FIG. 4 is a view illustrating the structure of a radio frame used in an LTE system.

Referring to FIG. 4, the radio frame has a length of 10 ms ($327200 \times T_s$) and includes 10 equally sized subframes. Each of the subframes has a length of 1 ms and includes two slots. Each of the slots has a length of 0.5 ms ($15360\ T_s$). In this case, $T_s$ denotes sampling time and is represented by $T_s=1/(15\ \text{kHz} \times 2048)=3.2552 \times 10^{-8}$ (about 33 ns). Each slot includes a plurality of OFDM symbols or SC-FDMA symbols in a time domain and includes a plurality of resource blocks in a frequency domain. In the LTE system, one resource block includes 12 subcarriers×7 (or 6) OFDM symbols or SC-FDMA symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
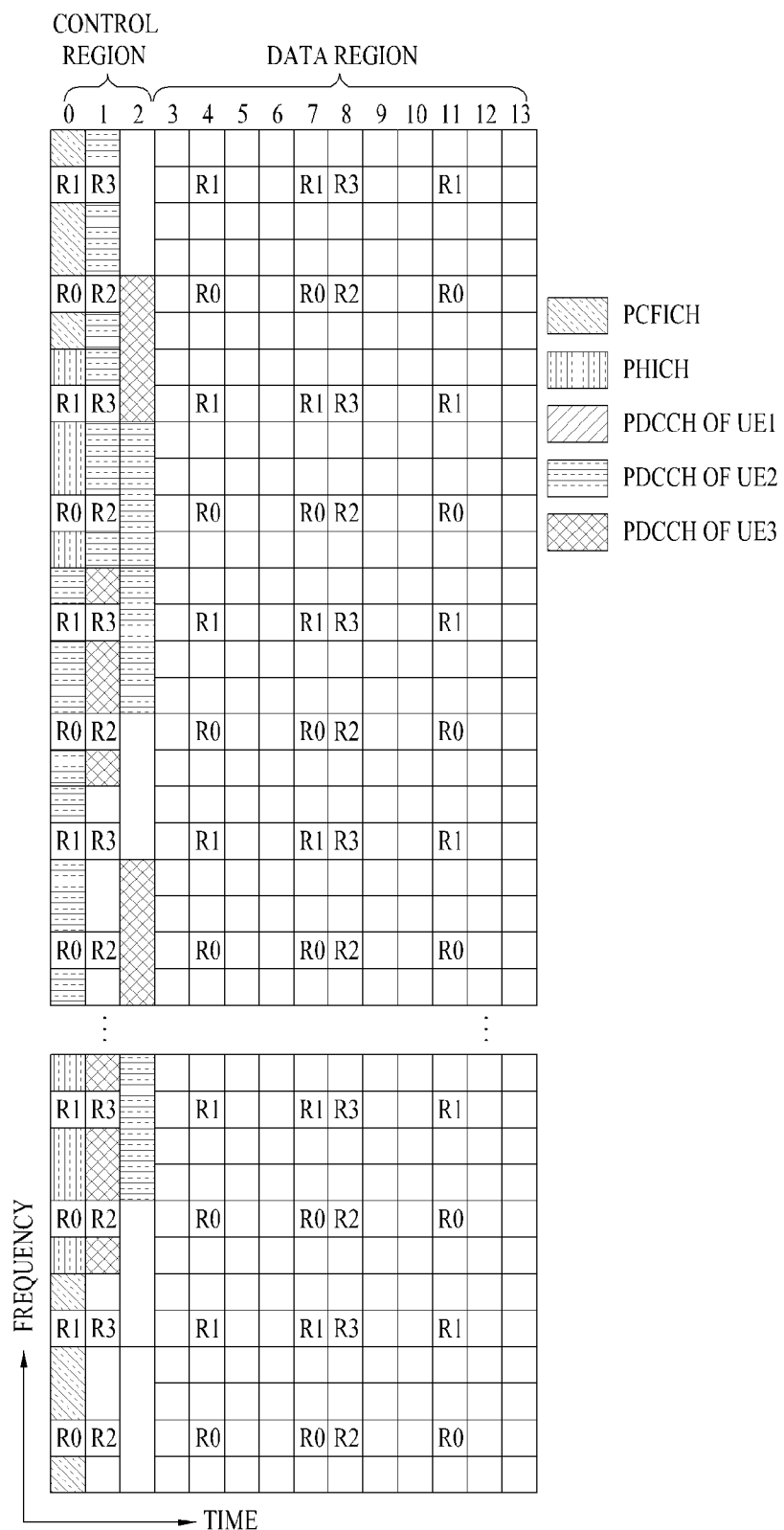
FIG. 5 is a view illustrating the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PC- FICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A' and information about data, that is transmitted using a radio resource 'B' (e.g. frequency location) and a DCI format 'C' of transport format information (e.g. transmission block size, modulation scheme, coding information, etc.), is transmitted through a specific subframe. In this case, a UE located in a cell monitors, i.e. blind-decodes, the PDCCH in a search space using RNTI information thereof. If one or more UEs having the RNTI 'A' are present, the UEs receive the PDCCH and receive the PDSCH indicated by 'B' and 'C' through the received PDCCH information.

Figure 6:
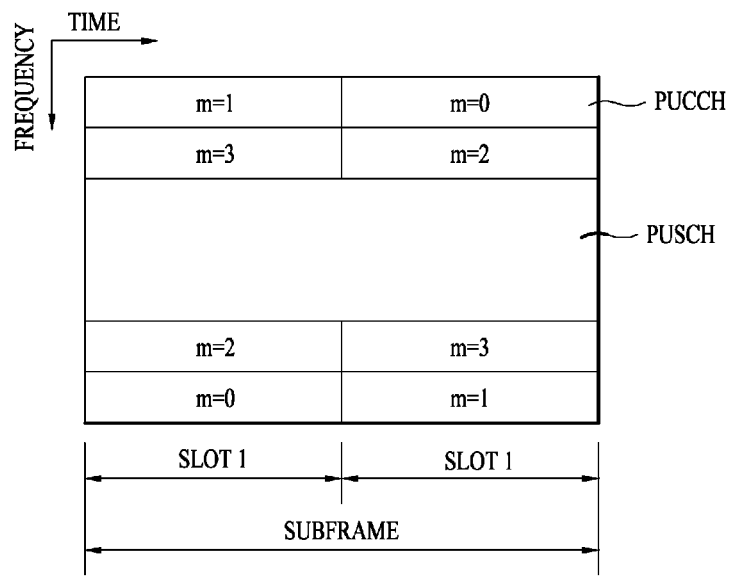
FIG. 6 is a view illustrating the structure of an uplink subframe used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one Resource Block (RB) in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmit antennas and multiple receive antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
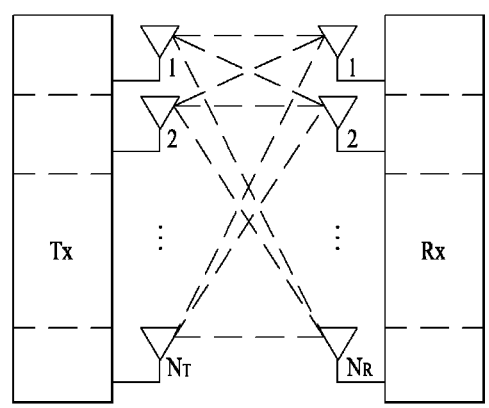
FIG. 7 is a view illustrating configuration of a general MIMO communication system.

The configuration of a general MIMO communication system described in the present invention is shown in FIG. 7. A transmitting end is equipped with $N_T$ transmit (Tx) antennas and a receiving end is equipped with $N_R$ receive (Rx) antennas. If a plurality of antennas is used both at the transmitting end and at the receiving end, theoretical channel transmission capacity increases unlike the case in which only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where Ri is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in capacity provided by the MIMO system was first demonstrated in the mid-1990s, various techniques for substantially improving data transfer rate have been under development. Several of these techniques have already been incorporated into a variety of wireless communication standards including, for example, third generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

In order to elucidate a communication method in a MIMO system in detail, a mathematical model thereof is given below. As shown in FIG. 4, it is assumed that $N_T$ Tx antennas and $N_R$ Rx antennas are present. In the case of a transmission signal, a maximum number of transmittable pieces of information is $N_T$ under the condition that $N_T$ Tx antennas are used, such that transmission information can be represented by a vector represented by the following equation 2.

$$s = [s_1, s_2, \ldots, s_{N_T}]^T \quad \text{[Equation 2]}$$

Meanwhile, individual pieces of transmission information $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, the physical meaning of a rank of a channel matrix may be a maximum number of different pieces of information that can be transmitted on a given channel. Accordingly, since the rank of the channel matrix is defined as the smaller of the number of rows and the number of columns, which are independent of each other, the rank of the matrix cannot be greater than the number of rows or columns. Mathematically, a rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply a 'stream'. The 'stream' may also be referred to as a 'layer'. The number of transmission streams is not greater than a rank of a channel, which is a maximum number of different pieces of transmittable information. Accordingly, the channel matrix H may be indicted by the following Equation 7.

$$\text{\# of streams} \leq \text{rank}(H) \leq \min(N_T, N_R) \quad \text{[Equation 7]}$$

Here, '# of streams' denotes the number of streams. It should be noted that one stream may be transmitted through one or more antennas.

There may be various methods of allowing one or more streams to correspond to multiple antennas. These methods may be described as follows according to types of MIMO technology. The case in which one stream is transmitted via multiple antennas may be called spatial diversity, and the case in which multiple streams are transmitted via multiple antennas may be called spatial multiplexing. It is also possible to configure a hybrid of spatial diversity and spatial multiplexing.

Meanwhile, in an LTE-A system of a next-generation mobile communication system, a Coordinated Multi-Point (CoMP) transmission scheme, which has not been supported in legacy standards, is expected to be supported to improve data transfer rate. The CoMP transmission scheme refers to a transmission scheme in which two or more eNBs or cells perform coordinated communication with a UE to improve communication performance between a UE located in a shadow area and an eNB (or cell or sector).

The CoMP transmission scheme may be divided into a coordinated MIMO Joint Processing (CoMP-JP) scheme through data sharing and a CoMP-Coordinated Scheduling/Beamforming (CoMP-CS/CB) scheme.

For downlink, in the CoMP-JP scheme, a UE may instantaneously and simultaneously receive data from individual eNBs employing a CoMP transmission scheme and may combine the received data, thereby improving reception performance (Joint Transmission (JT)). In addition, one of eNBs performing the CoMP-JP transmission scheme may transmit data to the UE at a specific time (Dynamic Point Selection (DSP)).

In the CoMP-CS/CB scheme, however, the UE may instantaneously receive data from one eNB through beamforming.

For uplink, in the CoMP-JP scheme, individual eNBs may simultaneously receive a PUSCH signal from a UE. In the CoMP-CS/CB scheme, however, only one eNB receives the PUSCH signal. Whether to use the CoMP-CS/CB scheme is determined by coordinated cells (or eNBs).

Hereinafter, a reference signal will be described in more detail.

Generally, to measure a channel, a Reference Signal (RS) known to a transmitting side and a receiving side is transmitted together with data from the transmitting side to the receiving side. Such an RS serves to perform a demodulation process by indicating a modulation scheme as well as channel measurement. The RS is classified into a dedicated RS (DRS), i.e. a UE-specific RS, for a BS and a specific UE and a Common RS, i.e. Cell-Specific RS (CRS), for all UEs in a cell. The CRS includes an RS for reporting a measurement result for CQI/PMI/RI measured in a UE to a BS and this RS is referred to as a Channel State Information-RS (CSI-RS).

Figure 8:
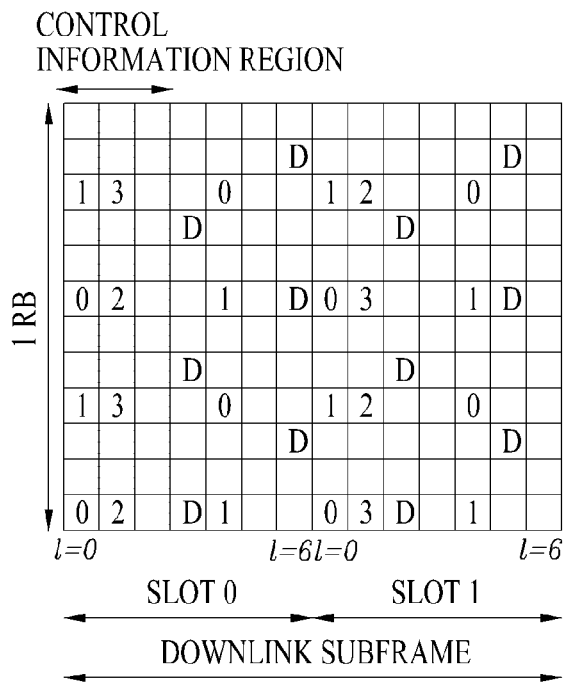
FIGS. 8 and 9 are views illustrating the structure of downlink RSs in an LTE system supporting downlink transmission using four antennas.
Figure 9:
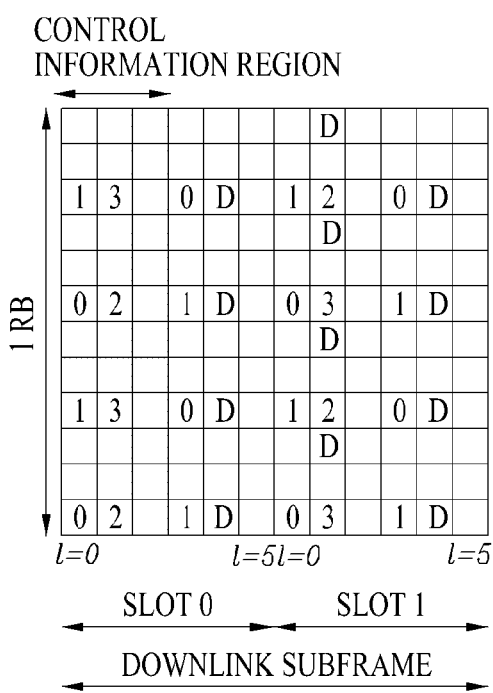

FIGS. 8 and 9 are views illustrating the structure of RSs in an LTE system supporting downlink transmission using four antennas. Specifically, FIG. 8 illustrates the structure of the RS in a normal CP and FIG. 9 illustrates the structure of the RS in an extended CP.

Referring to FIGS. 8 and 9, numbers 0 to 3 denoted in lattices indicate CRSs, i.e. cell-specific RSs, transmitted for channel measurement and data demodulation in correspondence to antenna ports 0 to 3, respectively. The CRSs may be transmitted to the UE in all control information regions as well as in data information regions.

In addition, 'D's denoted in lattices indicate downlink Demodulation-RSs (DM-RSs) which are UE-specific RSs. The DM-RSs support transmission of a single antenna port through a data region, i.e. through a PDSCH. Whether or not the DM-RS, which is a UE-specific RS, is present is signaled to the UE through higher layers. In FIGS. 8 and 9, DM-RSs corresponding to an antenna port 5 are illustrated. In the 3GPP standard document 36.211, DM-RSs for a total of 8 antenna ports, from an antenna port 7 to an antenna port 14, are defined.

Figure 10:
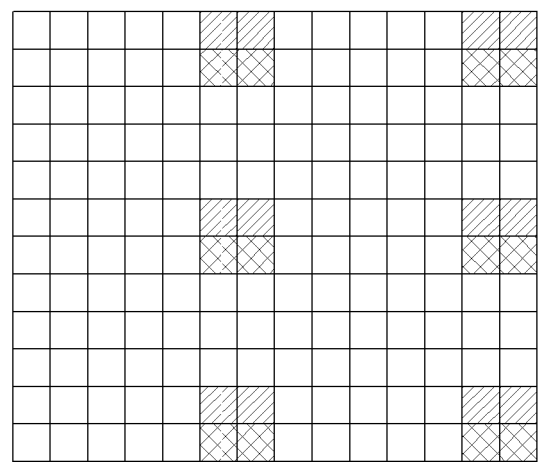
FIG. 10 illustrates an example of downlink DM-RS allocation defined in current 3GPP standard document.

FIG. 10 illustrates an example of downlink DM-RS allocation defined in current 3GPP standard document.

Referring to FIG. 10, DM-RSs corresponding to antenna ports {7, 8, 11, 13} are mapped using a sequence per antenna port in a DM-RS group 1. DM-RSs corresponding to antenna ports {9, 10, 12, 14} are also mapped using a sequence per antenna port in a DM-RS group 2.

Meanwhile, the above-described CSI-RS has been proposed for the purpose of channel measurement for a PDSCH, separately from the CRS. Unlike the CRS, the CSI-RS may be defined as a maximum of 32 different resource configurations to reduce Inter-Cell Interference (ICI) in a multi-cell environment.

CSI-RS (resource) configuration varies according to the number of antenna ports. CSI-RSs of resources configured as differently as possible between contiguous cells are transmitted. The CSI-RS supports a maximum of 8 antennas unlike a CRS. In 3GPP standard document, 8 antennas in total, from an antenna port 15 to an antenna port 22, are allocated as antenna ports for the CSI-RS. The following Table 1 and Table 2 show CSI-RS configurations defined in 3GPP standard document. Specially, Table 1 shows CSI-RS configurations in a normal CP and Table 2 shows CSI-RS configurations in an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |

TABLE 2-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure | 16 | (11, 1) | 1 | (11, 1) | 1 | (11, 1) | 1 |
| type 2 only | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
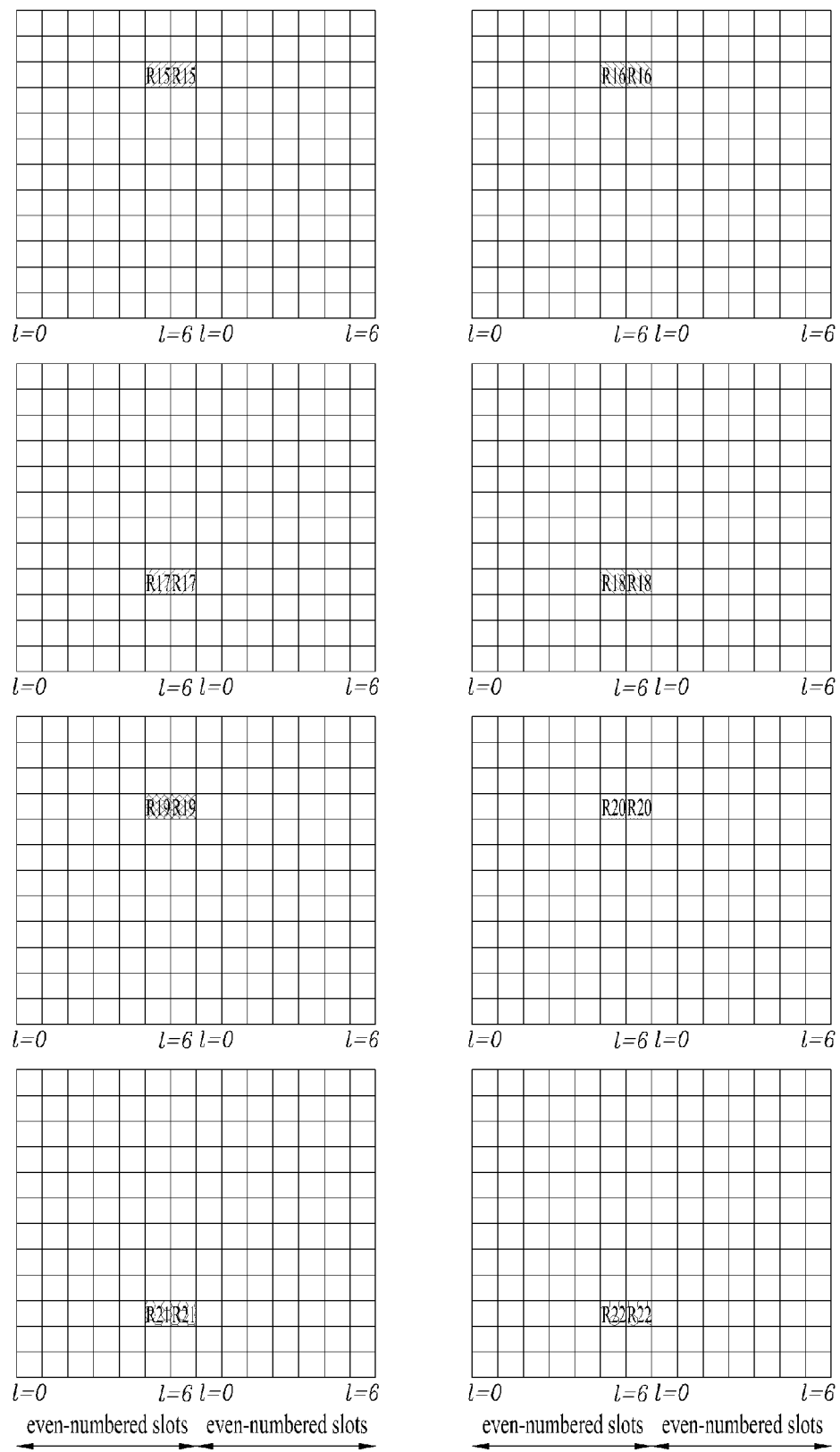
FIG. 11 illustrates CSI-RS configuration #0 in a normal CP among downlink CSI-RS configurations defined in current 3GPP standard document.

In Table 1 and Table 2, (k',l') denotes an RE index, k' denotes a subcarrier index, and l' denotes an OFDM symbol index. FIG. 11 illustrates CSI-RS configuration #0 in a normal CP among CSI-RS configurations defined in current 3GPP standard document.

In addition, a CSI-RS subframe configuration may be defined. The CSI-RS subframe configuration is represented by a periodicity $T_{CSI-RS}$ and a subframe offset $\Delta_{CSI-RS}$, expressed in subframes. The following Table 3 indicates CSI-RS subframe configurations defined in the 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

In a current cellular system, as the number of transmit antennas increases to improve transmission rate, pilot overhead and feedback overhead increase and such overhead hinders an effective deployment method of an actual system.

To estimate downlink multiple antenna channels in a UE, an orthogonal pilot resource per transmit antenna of a BS should be allocated. This means that pilot overhead increases because the pilot resource increases as the number of transmit antennas increases of the BS.

In addition, to feed back information about the downlink multiple antenna channels to the BS on uplink, the UE utilizes a codebook based feedback protocol. This means that feedback overhead increases because the number of bits that should be fed back to the BS increases as the size of a codebook increases. To reduce such feedback overhead, a method using differential feedback has been proposed. However, the UE needs to estimate actual physical antenna channels and thus pilot overhead still exists.

As a method for solving the aforementioned problems, the present invention proposes an antenna port configuration scheme of a Random beamformer based Virtual Antenna (RVA) and also proposes a signal transmission method and user scheduling method using the same. According to the present invention, the amount of pilot overhead and feedback overhead, necessary for channel estimation, may be restricted to a specific number of bits irrespective of increase in the number of antennas of the BS and performance can be effectively improved through persistent feedback.

Hereinafter, an RVA port configuration method is proposed and a method in which the UE feeds back CQI for each RVA port using the RVA port configuration method is proposed. In addition, a method for forming a hierarchical structure as a process of searching for a proper beamformer with respect to a selected UE is proposed.

First, as the RVA port configuration method, a BS generates L new random beamformers per subframe. Each of the L random beamformers generated in a current subframe has a vector size of (the number (M) of antennas of the BS)×1 and an l-th random beamformer among the L beamformers is denoted as $w_l$. For convenience of description, it is assumed that L=4 and M=16. In this case, the generated random beamformer $w_l$ may be indicated by the following Equation 8.

$$w_1 = \begin{bmatrix} w_{1,1} \\ w_{2,1} \\ \vdots \\ w_{16,1} \end{bmatrix}$$ [Equation 8]

$$w_2 = \begin{bmatrix} w_{1,2} \\ w_{2,2} \\ \vdots \\ w_{16,2} \end{bmatrix}$$

$$w_3 = \begin{bmatrix} w_{1,3} \\ w_{2,3} \\ \vdots \\ w_{16,3} \end{bmatrix}$$

$$w_4 = \begin{bmatrix} w_{1,4} \\ w_{2,4} \\ \vdots \\ w_{16,4} \end{bmatrix}$$

Instead of receiving channel information from an actual physical antenna port, a UE may receive the channel information using an RS from an RVA port configured through the random beamformer $w_l$. This is described with reference to FIG. 12.

Figure 12:
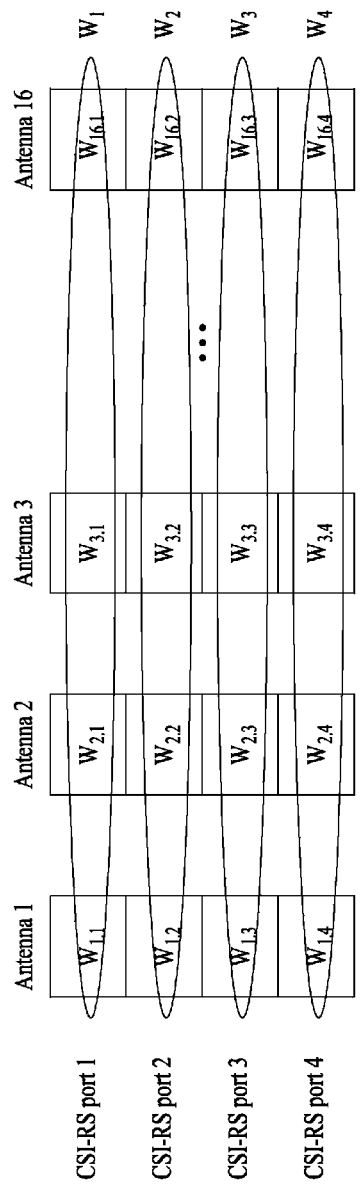
FIG. 12 illustrates a random beamformer mapping scheme per CSI-RS port according to an embodiment of the present invention.

FIG. 12 illustrates a random beamformer mapping scheme per CSI-RS port according to an embodiment of the present invention. Specifically, FIG. 12 illustrates allocation of an l-th random beamformer component corresponding to each antenna to an l-th CSI-RS port by using a CSI-RS.

Referring to FIG. 12, among components of a first random beamformer $w_l$, a component $w_{1,1}$ corresponding to a first antenna is mapped to a location corresponding to CSI-RS port 1 of a first antenna so as to be multiplied by a corresponding CSI-RS sequence element prior to transmission.

In this way, each random beamformer per CSI-RS port is mapped and then an RVA port is configured using information corresponding to an actual physical channel based on the mapped random beamformer. In this case, each CSI-RS port may be code-division-multiplexed over two or more REs as in a conventional scheme and may be applied upon being mapped over a single RE only.

Figure 13:
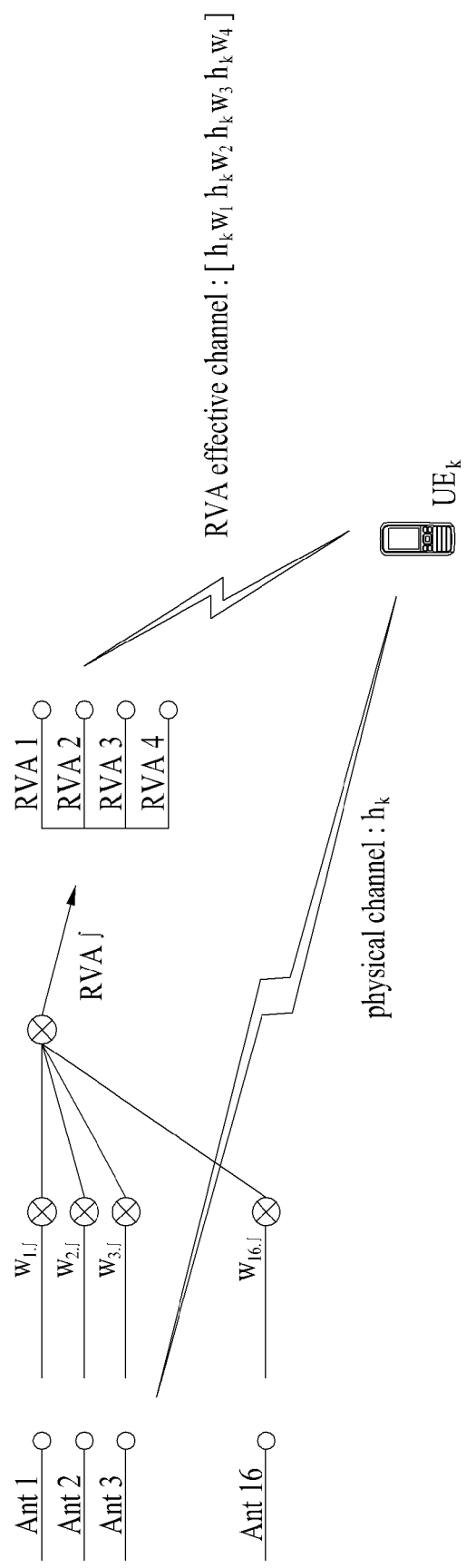
FIG. 13 is a view illustrating an effective channel formation from an RVA port according to an embodiment of the present invention.

FIG. 13 is a view illustrating an effective channel formation from an RVA port according to an embodiment of the present invention.

Referring to FIG. 13, it may be appreciated that a UE receives a signal through an effective channel defined using an RVA port rather than through a channel with an actual physical antenna.

When L=4, the number of effective channels of RVA ports is determined to be 4. If actual physical channel information between a BS and a k-th UE is denoted as $h_k$, effective channels received by the UE through the RVA ports may be expressed as $h_k w_1$, $h_k w_2$, $h_k w_3$, and $h_k w_4$ with respect to the respective ports. That is, the number of pieces of signal information that should be received by the UE is equal to a number proportional to the number of RVA ports irrespective of the number of physical antennas of the BS.

Thus, the k-th UE estimates an effective channel $gain_{l,k}$ of an l-th RVA port from a signal received through a CSI-RS port and feeds back an effective channel gain per RVA port to the BS using a specific bit field. As feedback schemes under consideration, an existing CQI form may be reused, each state value quantized to a specific bit number may be predefined, or state values may be semi-statically configured from a higher layer through RRC signaling.

For convenience of description, in the present invention, a method for reporting an effective channel gain per RVA port by reusing the existing CQI form will be explained by way of example. However, the technical sprit of the present invention is not limited thereto and is patently applicable to the other aforementioned schemes.

The UE may feed back effective channel gain information per RVA port of a CQI form to the BS. Then, the BS may select a specific UE suitable for a random beamformer generated on a subframe basis, using the feedback information and allocate the selected beamformer to the UE, for signal transmission. In this process, the BS may use a variety of methods to allocate a beamformer suitable for the UE based on the feedback information.

The BS generates an independent random beamformer in every subframe and each UE feeds back an effective channel gain to the BS through a signal received from an RVA port configured based on the random beamformer. In this case, if information corresponding to all RVA ports is always fed back, overhead thereof will increase. Accordingly, the UE and the BS may define various feedback modes.

Figure 14:
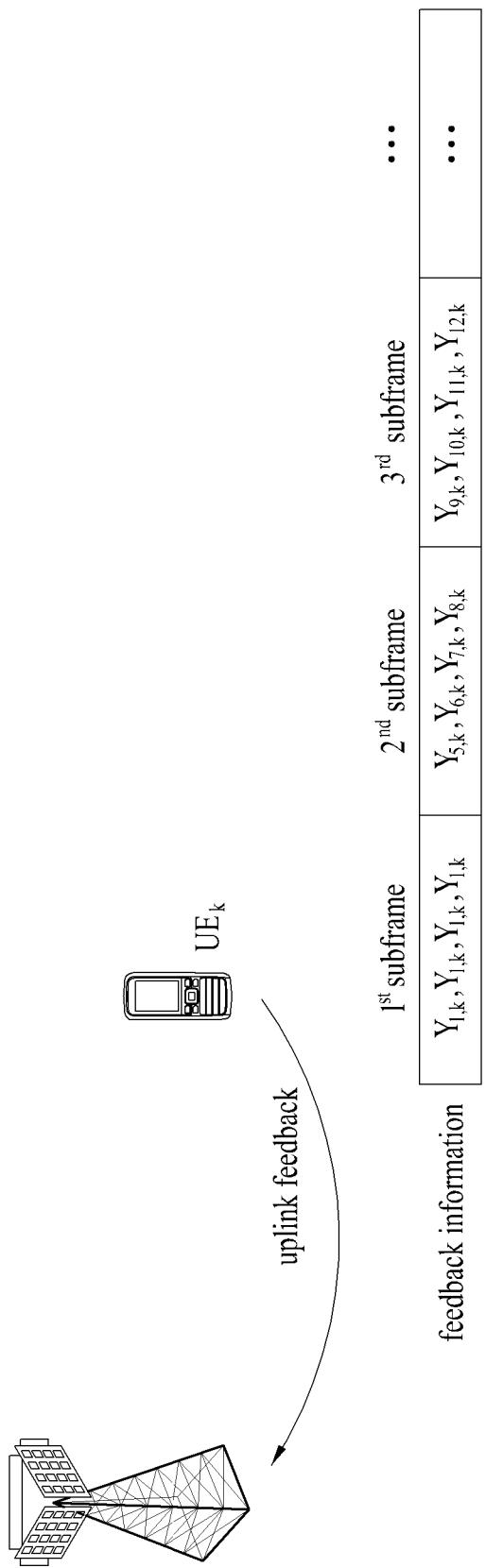
FIG. 14 illustrates an uplink feedback process of transmitting an effective channel gain per RVA port to a BS according to an embodiment of the present invention.

In a first mode, feedback on all RVA ports may always be performed the number of times corresponding to the number of RVA ports, L, on a subframe basis. FIG. 14 illustrates an uplink feedback process of transmitting an effective channel gain per RVA port to a BS according to an embodiment of the present invention.

Next, there may a mode in which the UE performs feedback only on a specific RVA port, through a selection process, among L RVA ports. There also may be a mode in which the UE performs feedback only on a specific port selected by the BS. Such feedback modes may be changed based on feedback information received by the BS from the UE and the UE may be informed of mode change through higher layer signaling such as RRC signaling. Namely, only feedback necessary for the UE and the BS can be transmitted and thus overhead can be reduced.

The present invention is more suitable for an environment having low channel time variance. As methods for overcoming such restrictions, the BS may transmit signaling information (e.g. a CRS, a CSI-RS, Tracking RS (TRS), or a specific RS such as a DMRS) capable of discerning a channel time variance to the UE and the UE may feed back channel variation information of a specific type regarding the signaling information. That is, the BS may transmit specific signaling information in a first subframe and the UE may estimate and feed back the signaling information, so that the BS may be aware how much a channel is changed.

How frequently the UE should perform feedback depends on circumstance. To confirm a more accurate channel time variance, feedback may be performed every subframe. This has an advantage of accurately recognizing channel variation because channel state information can be confirmed in every subframe.

However, as a method for reducing feedback overhead, feedback may be performed only when a channel is significantly changed (e.g. when a specific event is triggered). Namely, if a magnitude of variation of signaling used to discern the degree of channel time variation by a predetermined reference is within a specific range, a channel is judged to be invariant and thus feedback is not performed. However, if the magnitude of variation of signaling exceeds the specific range, the UE informs the BS that a channel has changed much than a previous one.

If the UE informs the BS of an effective channel gain from an RVA port through feedback and the BS determines a preferred UE per RVA port, a method for generating a random beamformer having a hierarchical structure between consecutive subframes may be employed as opposed to a scheme for determining a preferred beamformer through one-time feedback without connectivity between consecutive subframes.

Hereinbelow, a scheme for generating a random beamformer of such a hierarchical structure, and proposed technologies regarding a scheduling operation method using the scheme will be described in detail with reference to FIG. 15.

FIG. 15 is a view illustrating a scheme for generating a random beamformer of a hierarchical structure according to an embodiment of the present invention. First, a process in a first subframe may be performing feedback with respect to all of L RVA ports.

In FIG. 15(a), a channel space is divided into L Voronoi regions based on L random beamformers generated in the first subframe. The generated L random beamformers form a centroid vector of each region and the L RVA ports are configured based on the centroid vector.

Although various methods may be used to configure the L RVA ports, a scheme for selecting beamformers using correlation between the beamformers will be considered hereinbelow. The scheme for selecting beamformers that will be used for signal transmission through the L RVA ports is performed such that a total of N random beamformers $V=\{v_1\ v_2\ \ldots\ v_N\}$ is generated first and, among them, $v_i$ is randomly selected as a first centroid vector $c_1$ to be used for signal transmission through a primary RVA port, for initial configuration of $C=\{c_1\}$.

Next, as indicated by the following Table 4, a procedure is repeated as many times as $l=2, \ldots, L$. As a result, a centroid vector set $C=\{c_1\ c_2\ \ldots\ c_L\}$ that will be used for signal transmission through the primary RVA port may be determined.

TABLE 4

For l = 2, . . . , L,
$$c_l = \underset{v_k}{\mathrm{argmin}} \|v_k^H C\|^2,\ v_k \in V \setminus C$$
$$= \underset{v_k}{\mathrm{argmin}} \sum_{i=1}^{l-1} |v_k^H c_i|^2$$
$$C = C \cup \{c_l\}$$
end The loop shown in Table 4 repeats the procedure of calculating correlation between the previously selected centroid vector set $C=\{c_1\ c_2\ \ldots\ c_{l-1}\}$ and $v_k$ that is not selected and selecting a beamformer having the least correlation as another centroid vector $c_l$.

Finally, the above procedure is repeated until beamformer vectors of the L RVA ports are selected so that the vector set C to be used for the primary RVA port is configured. If a signal is transmitted to the UE using the beamformer vector set C, the UE feeds back a port index having the highest CQI in Voronoi regions divided as illustrated in FIG. 15(a) and the CQI value to the BS.

FIG. 15(b) illustrates a process of obtaining channel information in an n-th subframe after a first subframe.

For example, if the UE feeds back information indicating that the UE prefers a centroid vector in the third quadrant to the BS in the first subframe as shown in FIG. 15(a), the BS generates L new random beamformers having a hierarchical structure based on the centroid vector in the third quadrant.

After receiving feedback on the primary RVA port from the UE, the BS needs to select a beamformer that should be transmitted in the next process or in the next subframe. That is, to select a beamformer to be used for a secondary RVA port per UE, the BS categorizes the above $V=\{v_1\ v_2\ \ldots\ v_N\}$ into L groups based on the previously selected beamformer vector set C and configures a total of L Voronoi regions so that each group forms one Voronoi region.

As an example of this method, in the present invention, correlation between the previously selected beamformer vector set C and $v_k$ is calculated and $v_k$ is included in a Voronoi region configured by a specific $c_1$ having the highest correlation with $v_k$ among $C=\{c_1\ c_2\ \ldots\ c_L\}$. As a result, all of $V=\{v_1\ v_2\ \ldots\ v_N\}$ is categorized such that each element $v_k$ thereof belongs to any one of the Voronoi regions of the L beamformers.

The reason why the beamformer having the highest correlation with the previously selected beamformer is selected in the Voronoi region is that only L beamformers having the least correlation are selected from among beamformers in the Voronoi region as a region needed to select beamformers of next transmission and are transmitted to the UE. This will be described with reference to FIG. 16.

FIG. 16 illustrates an example of region determination according to correlation between a centroid vector and a random beamformer.

Referring to FIG. 16, since random beamformers $v_1$ and $v_3$ have the highest correlation with a centroid vector $c_1$, $v_1$ and $v_3$ belong to a Voronoi region of $c_1$. Another $v_k$ is also included in a region to which a centroid vector having the highest correlation with $v_k$ belongs.

In this way, an algorithm for determining the primary RVA port using regions segmented based on the previously selected centroid vector is reapplied. When a beamformer used for the primary RVA port is selected, a first centroid vector is randomly selected but the previously selected beamformer is used after secondary transmission.

That is, if it is assumed that $c_1$ is allocated to UE #1, $c_2$ is allocated to UE #2, and beamformer sets belonging to respective centroid vector regions are $\{v_1, v_2, \ldots, v_{100}\}$ and $\{v_{101}, v_{102}, \ldots, v_{200}\}$, a new centroid vector set $C=\{c_1\ c_2\ \ldots\ c_L\}$ for UE #1 is determined such that $c_1$ is configured identically to allocation in the primary process, correlation with the set $\{v_1, v_2, \ldots, v_{100}\}$ is calculated based on $c_1$, (L−1) beamformers having the least correlation are selected, thereby determining $c_2, \ldots, c_L$.

As an alternative method, instead of fixedly using $c_1$ as a previously selected beamformer, a scheme may be applied in which a first centroid vector is randomly selected similarly to the primary process. However, even in this case, there is a difference with the primary process in that, instead of randomly selecting centroid vectors for all of $V=\{v_1\ v_2\ \ldots\ v_N\}$, the BS configures a new $c_1$ by randomly selecting $c_1$ only in a segmented Voronoi region (e.g. only in $\{v_1, v_2, \ldots, v_{100}\}$) in case of UE #1), correlation with the set $\{v_1, v_2, \ldots, v_{100}\}$ is calculated based on $c_1$ as in the above process, and (L−1) beamformers having the least correlation are selected to determine/allocate $c_2, \ldots, c_L$.

As characteristics of a scheme using a hierarchical structure, primary transmission of a broadcast form can be performed with respect to all target UEs using the same beamformer through an RVA port and, in later transmission, only specifically selected UEs can receive L new common RVA ports. That is, the hierarchical structure use scheme may be applied such that only UEs to which the same specific beamformer is allocated in a primary process receive the same L new RVA ports in a secondary process.

In this case, the hierarchical structure refers to a structure configuring L random beamformers having a specific value or more by comparing a correlation value with a random beamformer (e.g. in a corresponding Voronoi region) generated in a current subframe based on a random beamformer preferred by the UE in a previous subframe. Based on the random beamformers generated through this process, the UE feeds back the preferred random beamformer to the BS as shown in FIG. 15(b) and this process is repeatedly performed.

In addition, there may be two parts for determining beamformers through correlation when the hierarchical structure is used. One is to select beamformers having low correlation when the BS selects/allocates L beamformers to be used for an RVA port in a determined Voronoi region and the other is to select beamformers having high correlation in order to configure a Voronoi region needed to determine beamformers to be used in an RVA port in the next subframe (e.g. a later subframe indicated by specific dynamic indication or a later subframe configured with a specific periodicity).

To indicate the subframe by dynamic indication, the BS may indicate, through a specific field of a specific DCI format, whether a current subframe is a subframe in which the UE measures a signal of a specific RVA port with respect to a random beamformer selection process by the RVA port and the UE should related feedback (e.g. report in the CQI form).

For example, a portion of an aperiodic CSI triggering field of an uplink-related DCI format such as DCI format 0 and DCI format 4 may be reused or an aperiodic triggering form similar thereto may be used. That is, the BS may configure information such as the following 1) to 5) in a specific state defined by a field which may be the dynamic indication in advance through higher layer signaling:

1) number of RVA ports, 2) resource configuration of an RVA port (e.g. RE position, etc.), 3) RS sequence scrambling seed value corresponding to an RVA port, 4) in the case of using a port of another existing RS such as a CSI-RS, configuration of corresponding RS related resource location/period/offset or, in the case of configuration as additional RRC information, index information indicating the configuration, and 5) feedback configuration (e.g. only CQI report per RVA port) about feedback type of the UE through reception of such an RVA port or, if previous feedback configuration is present, an indicator indicating such a feedback mode.

Meanwhile, in the case in which the "next subframe" is periodically configured, the BS may configure periodic RVA port transmission in advance through RRC signaling to transmit information of resource location/period/offset in which the RVA port is transmitted to the UE. This may have a similar form to existing CSI-RS configuration or may be defined separately therefrom. If specific RS configuration such as existing CSI-RS configuration is used, index information about which RS resource is used may be configured. Information on the RVA port transmission configuration may include the number of RVA ports, resource location, period, offset, and an RS sequence scrambling seed value corresponding to the RVA port, which is similar to information regarding CSI-RS configuration.

Additionally, the BS may inform the UE of information indicating a corresponding order of an M-ary random beamforming process of primary, secondary, etc. That is, the UE may be informed that a current subframe transmitted by a specific period/offset is the M-ary random beamforming process. Upon receiving the RVA port transmission configuration, the UE is aware that the next related subframe is specific M-ary random beamforming since period/offset information is configured in a form including a reference point of a frame number, etc.

If the current subframe is determined to be the primary random beamforming process through such information, the UE is aware that all UEs receive the same RVA port information and may normally perform CQI feedback.

If the UE receives an RVA port caused by specific M-ary (M>1) random beamforming after primary random beamforming, since only UEs, which have reported that the same beamformer is preferred in the primary process, commonly receive a newly updated RVA port, the BS may pre-configure, on a group basis, different RVA port resources (e.g. according to the above example of the present invention, since L=4, resource groups may be split into different RVA port resource groups, during secondary random beamforming, which are four times the resource groups) which are to be used during specific M-ary (M>1) random beamforming. Moreover, the BS may separately command the UE as to which RVA port group the UE should measure, through dynamic indication.

Through this configuration, the BS may previously inform the UE of detailed information indicating how many times random beamforming is performed through higher layer signaling. For example, if the BS informs the UE that random beamforming will be performed by an RVA port a total of two times, categorized random beamforming is applied up to (a) and (b) processes of FIG. 15. In addition, the BS may inform the UE in how many subframes the M-ary RVA port is repeatedly transmitted even during each M-ary random beamforming process, through RRC signaling. That is, to raise measurement performance of an RVA port, detailed subframe period/offset information about how many times M-ary random beamforming process is repeatedly transmitted and about in which subframe the M-ary random beamforming is performed may be individually configured.

The BS selects the UE for multi-user MIMO signal transmission based on information collected from the UE and performs a beamformer update process. In this process, beamformer update can be performed according to various methods and a method for selecting the UE based on a Signal-to-Leakage Ratio (SLR) of a random beamformer and allocating an RVA port will be described hereinbelow by way of example.

According to the present invention, pilot and feedback overhead necessary for channel estimation may be restricted to a specific value, irrespective of increase in the number of antennas of the BS. Conventional schemes are problematic in that orthogonal pilot resources necessary for channel estimation increase as the number of antennas increases. However, when an RVA port is used through a random beamformer, since the number of specific ports is determined irrespective of the number of antennas of the BS, the amount of pilot and feedback overhead can be restricted through the proposed scheme. Further, a predefined codebook is not needed due to use of the random beamformer. This means that a conventional PMI feedback process from the UE to the BS is not needed.

When the RVA port is configured through the random beamformer and an effect of a method for the UE to feed back CQI per RVA port is considered, an assumption that the sum of noise power and interference power between neighboring cells is 1 is needed in the present invention. In addition, it is assumed that a channel vector per UE consists of elements having an independent complex normal distribution and a generated channel is invariant according to progression of a subframe. If the present invention is performed based on the above assumption, CQI information per RVA port in a current subframe is collected from UEs. The CQI information indicates an effective channel gain expressed as multiplication of channel information between a UE and a BS and a random beamformer allocated to an RVA port. In a first subframe, an RVA port having the greatest CQI value per UE is allocated.

Figure 18:

FIGS. 17 to 19 illustrate algorithms for selecting a UE using an SLR according to an embodiment of the present invention. Especially, in FIGS. 17 to 19, a UE having the greatest CQI value is expressed by hatching.

Referring to FIG. 17, an SLR value per RVA port is calculated and the calculated SLR value is defined as two parameters x and y, wherein x denotes a channel gain from a UE to which the RVA port is allocated and corresponds to a value expressed by hatching in FIG. 17 and y denotes the sum of channel gains from UEs to which the RVA port is not allocated and corresponds to the sum of values except for x in each column of FIG. 17.

According to a CQI value and an SLR in FIG. 17, each RVA port is allocated to UE #1, UE #7, UE #11, and UE #12. If a UE to which an RVA port is allocated is determined, signal transmission is performed through the allocated RVA port. In FIG. 17, a transmission rate may be calculated as about 3.78 bps/Hz. The same process is repeated even in the next subframe process after the first subframe process is ended. CQI information per RVA port of consecutive subframes is collected from the UE and a combination between UEs and RVA ports is updated.

Accordingly, combinations, which have been excluded in a previous subframe, may be added. If a current combination has a greater value than an SLR value of a previous combination, the current combination may be updated and signal transmission is then performed using an RVA port allocated through this process. If the same UE prefers a plurality of RVA ports in a specific subframe, scheduling is performed according to the SLR value.

Referring to FIG. 18, in the second subframe, UE #9 prefers the fifth and sixth RVA ports. However, since the fifth RVA port has an SLR of 0.35 and the sixth RVA port has and SLR of 0.25, the fifth RVA port is allocated to UE #11.

Lastly, referring to FIG. 19 illustrating a finally scheduled situation, the sum of transmission rates of a system is calculated as 3.86 bps/Hz which indicates improved performance compared with 3.78 bps/Hz which is the sum of transmission rates in the first subframe.

FIG. 20 is a view illustrating performance evaluation according to the number of RVA ports and the number of subframes when the present invention is applied. Especially, it is assumed in FIG. 20 that the number of antennas of a BS is fixed to 32.

Referring to FIG. 20, it can be understood that the sum of transmission rates increases gradually as the number of subframes increases. Namely, as the subframes increase, a beamformer suitable for a UE is searched for and, thus, a transmission rate increases. In addition, performance comparison according to the number of RVA ports can be confirmed. In other words, it can be confirmed that there is a performance difference of about 2 bps/Hz when L=40 as compared when L=8 and this indicates that accurate estimation of a channel is easy by increasing the number of virtual antenna ports.

Figure 21:
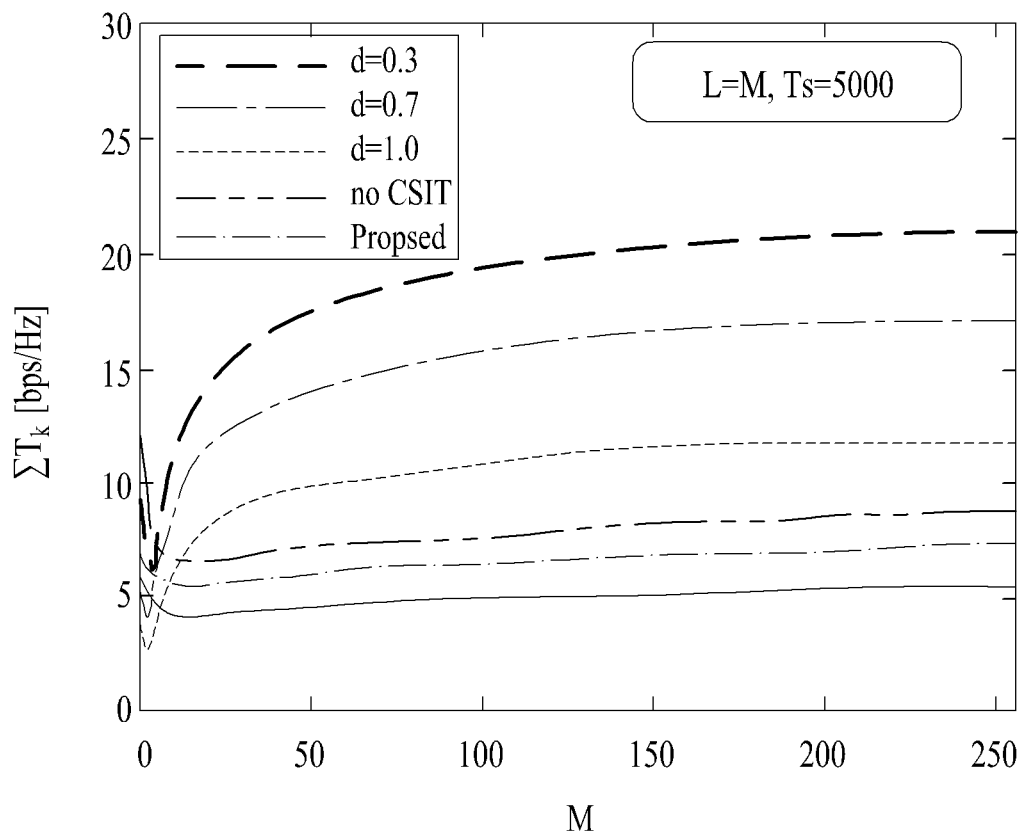
FIG. 21 is a view illustrating performance comparison evaluation between a prior art method and the present invention.

FIG. 21 is a view illustrating performance comparison evaluation between a prior art method and the present invention. Specifically, it is assumed for convenience of description that two BSs are present, 30 UEs are present in the distance between the BSs (F30), and Opportunistic Beamforming (OB) having orthogonal properties is used.

Particularly, FIG. 21 illustrates comparison of the present invention and prior art when the number of subframes is fixed to 5000 and indicates that the present invention provides a gain two to three times that of the prior art method in a specific distance. Through this comparison, it can be appreciated that the proposed scheme can perform accurate channel estimation.

Next, an effect when a hierarchical structure is used will be described. For convenience of description, it is assumed that a channel vector per UE consists of elements having an independent complex normal distribution and a generated channel remains unchanged according to progression of subframes. It is also assumed that the number of antennas of the BS is 4, the number of UEs having a single antenna is 4, and the number of random beamformers is 1024.

First, four beamformers necessary for transmission are determined through the above algorithm ($c_1=v_{70}$, $c_2=v_{713}$, $c_3=v_{898}$, $c_4=v_{276}$). Next, the BS collects CQI information per RVA port in a current subframe from the UEs, allocates an RVA port having the greatest CQI value to each UE, calculates an SLR value per RVA port, and determines a beamformer necessary for the next transmission RVA port per UE based on the calculated SLR value.

Figure 22:
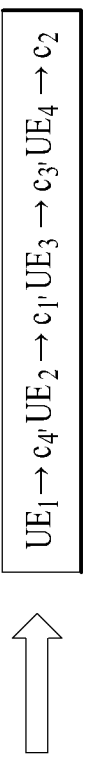
FIG. 22 illustrates an example of determining a beamformer through a primary RVA port according to an embodiment of the present invention.

FIG. 22 illustrates an example of determining a beamformer through a primary RVA port according to an embodiment of the present invention. In FIG. 22, a value expressed by hatching corresponds to a maximum value per port and, thus, a beamformer is allocated to each UE. That is, $c_4$ is allocated to UE #1, $c_1$ is allocated to UE #2, $c_3$ is allocated to UE #3, and $c_2$ is allocated to UE #4.

Next, for secondary RVA port transmission using a hierarchical structure, beamformer candidates to be used in each port are determined. That is, the beamformer candidate is determined as follows: UE #1→{$c_1=v_{276}$, $c_2=v_{571}$, $c_3=v_{256}$, and $c_4=v_{424}$}, UE #2→{$c_5=v_{70}$, $c_6=v_{465}$, $c_7=v_{372}$, and $c_8=v_{379}$}, UE #3→{$c_9=v_{898}$, $c_{10}=v_{563}$, $c_{11}=v_{615}$, and $c_{12}=v_{900}$}, and UE #4→{$c_{13}=v_{713}$, $c_{14}=v_{526}$, $c_{15}=v_{775}$, and $c_{16}=v_{193}$}.

FIG. 23 illustrates a process of searching for a beamformer, which is more suitable for a UE, using a new RVA port selected based on a UE selected through a primary RVA port using a hierarchical structure.

Referring to FIG. 23, since $c_4=v_{424}$ has been allocated to UE #1 in primary RVA transmission, a region of beamformers having the highest correlation with $c_4$ is selected and a new centroid vector among the beamformers belonging to this region is selected. In FIG. 23, UE #1 is assigned $v_{571}$ by selecting a beamformer having the greatest SLR values in the new centroid vector and, thus, the beamformers are changed. Similarly, the beamformers allocated to UE #2 are changed. If a centroid vector is selected again as in UE #3 and UE #4, beamformers allocated thereto are also changed.

Hereinafter, system performance using a hierarchical structure scheme will be described.

For convenience of description, an environment of F30, i.e. an environment in which two BSs are present and 30 UEs are present in the distance between BSs is considered, and random beamforming $v_k$ is used and the number of random beamforming processes is evaluated as 1024. Moreover, various evaluations for 2 to 32 antennas of the BS have been made and the number of RVA ports has been fixed to the smaller of the number of UEs and the number of antennas.

Figure 24:
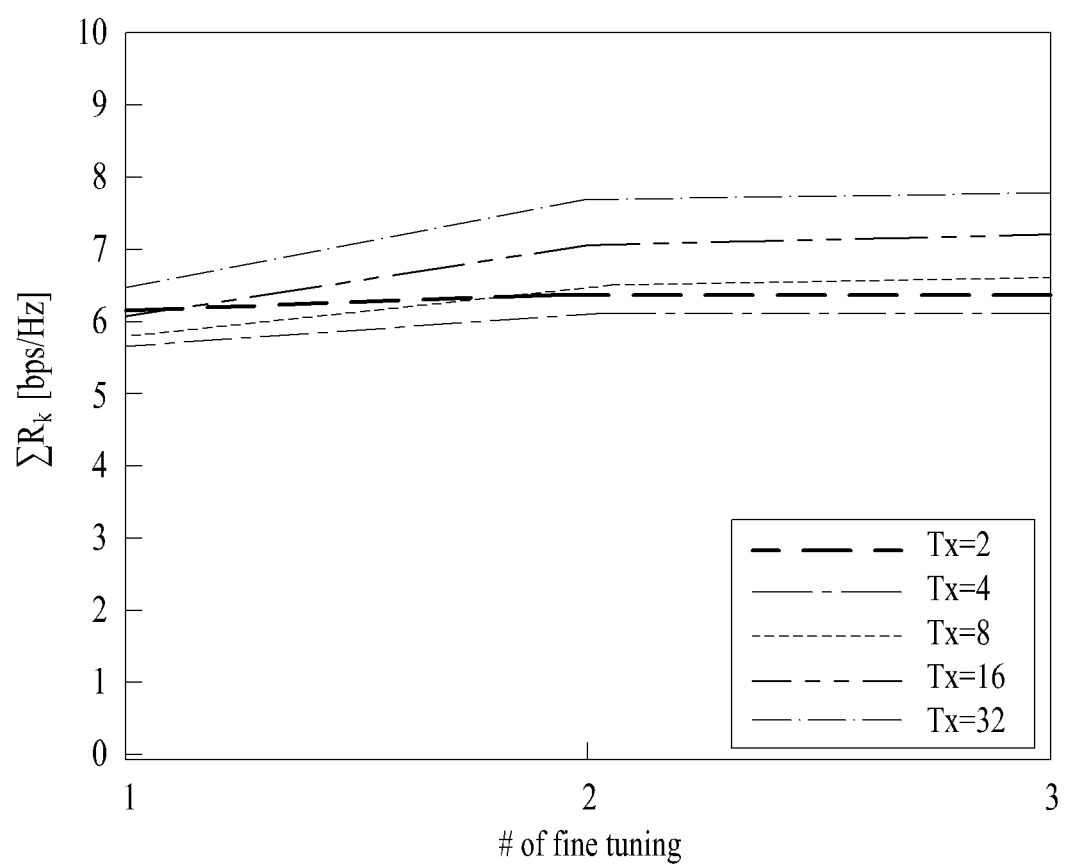
FIG. 24 illustrates performance evaluation according to the number of algorithms using a hierarchical structure scheme.

FIG. 24 illustrates performance evaluation according to the number of algorithms using a hierarchical structure scheme.

Referring to FIG. 24, the sum of transmission rates increases as the number of algorithms increases because a process of searching for a beamformer suitable for each UE becomes increasingly accurate according to the number of algorithms. Therefore, more accurate channel estimation can be performed by applying a hierarchical structure scheme.

Figure 25:
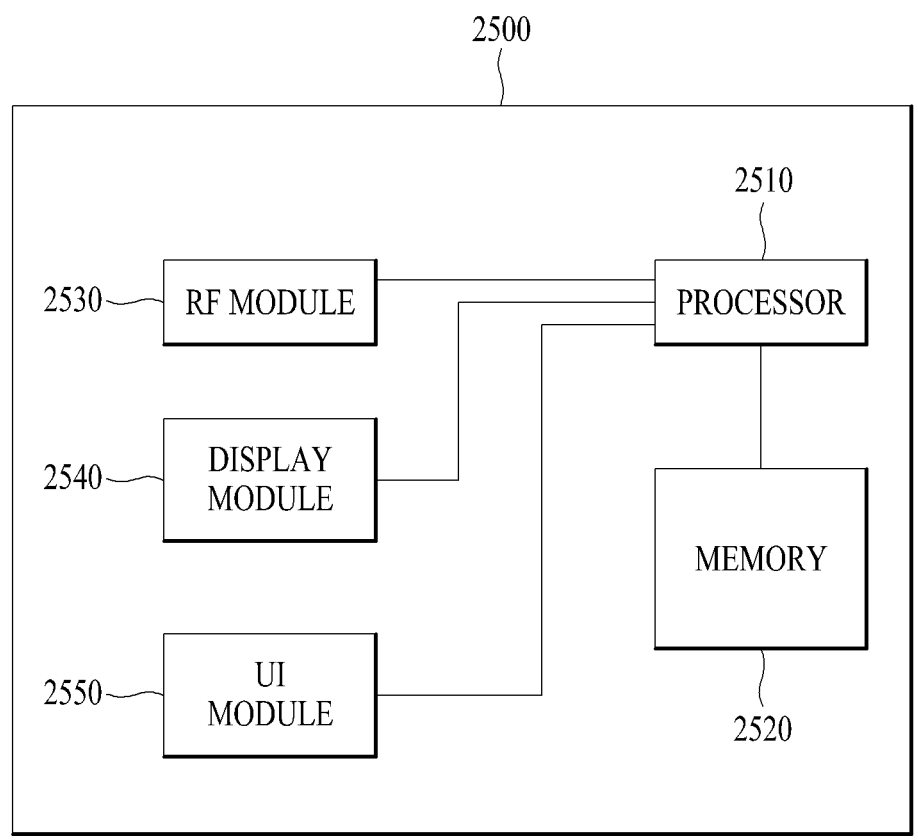
FIG. 25 is a block diagram illustrating a communication apparatus according to an embodiment of the present invention.

FIG. 25 is a block diagram illustrating a communication apparatus in accordance with an embodiment of the present invention.

Referring to FIG. 25, a communication device 2500 includes a processor 2510, a memory 2520, a Radio Frequency (RF) module 2530, a display module 2540, and a User Interface (UI) module 2550.

The communication device 2500 is illustrated for convenience of the description and some modules may be omitted. Moreover, the communication device 2500 may further include necessary modules. Some modules of the communication device 2500 may be further divided into sub-modules. The processor 2500 is configured to perform operations according to the embodiments of the present invention exemplarily described with reference to the figures. Specifically, for a detailed description of operations of the processor 2100, reference may be made to the contents described with reference to FIGS. 1 to 24.

The memory 2520 is connected to the processor 2510 and stores operating systems, applications, program code, data, and the like. The RF module 2530 is connected to the processor 2510 and performs a function of converting a baseband signal into a radio signal or converting a radio signal into a baseband signal. For this, the RF module 2530 performs analog conversion, amplification, filtering, and frequency upconversion or inverse processes thereof. The display module 2540 is connected to the processor 2510 and displays various types of information. The display module 2540 may include, but is not limited to, a well-known element such as a Liquid Crystal Display (LCD), a Light Emitting Diode (LED), or an Organic Light Emitting Diode (OLED). The UI module 2550 is connected to the processor 2110 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

A specific operation described as performed by the BS in this document may be performed by an upper node of the BS in some cases. Namely, it is apparent that, in a network comprised of a plurality of network nodes including the BS, various operations performed for communication with the UE may be performed by the BS, or network nodes other than the BS. The term BS may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

According to the embodiment of the present invention, a transmitter and a receiver can efficiently perform signal transmission and reception using random beamforming.

While the above-described signal transmission and reception method using random beamforming in a wireless communication system and the apparatus therefor have been described centering on an example applied to a 3GPP LTE system, the present invention is applicable to a variety of wireless communication systems in addition to the 3GPP LTE system.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

What is claimed is:

1. A method for transmitting a signal to a user equipment by a base station in a wireless communication system, comprising:
   generating randomly a first beamforming vector set for a first subframe;
   configuring a first random beamformer corresponding to the first subframe from the first beamforming vector set;
   transmitting a downlink signal to the user equipment in the first subframe using the first random beamformer;
   receiving information about a preferred beamforming vector from the user equipment;
   generating a second beamforming vector set for a second subframe based on the preferred beamforming vector;
   configuring a second random beamformer corresponding to the second subframe; and
   transmitting the downlink signal to the user equipment in the second subframe using the second random beamformer,
   wherein configuring the first random beamformer comprises:
   a) including a first beamforming vector into the first random beamformer by selecting randomly the first beamforming vector from the first beamforming vector set;
   b) including a second beamforming vector into the first random beamformer by selecting, from the first beamforming vector set, the second beamforming vector having the least correlation with one or more beamforming vectors included in the first random beamformer; and
   c) repeating the step b) until the beamforming vectors as much as a number of virtual antennas of the base station are included in the first random beamformer,
   wherein configuring the second random beamformer comprises:
   d) including a third beamforming vector into the second random beamformer by selecting randomly the third beamforming vector from the second beamforming vector set;
   e) including a fourth beamforming vector into the second random beamformer by selecting, from the second beamforming vector set, the fourth beamforming vector having the least correlation with one or more beamforming vectors included in the second random beamformer; and f) repeating the step e) until the beamforming vectors as much as the number of virtual antennas are included in the second random beamformer.

2. The method according to claim 1, further comprising: transmitting information about the first random beamformer to the user equipment.

3. The method according to claim 2, wherein the information about the preferred beamforming vector is information about one of the beamforming vectors included in the first random beamformer.

4. The method according to claim 2, further comprising: transmitting information about the second random beamformer to the user equipment.

5. The method according to claim 2, wherein the virtual antennas of the base station include one or more antenna ports.

6. The method according to claim 5, further comprising transmitting information about a reference signal defining the virtual antennas to the user equipment.

7. The method according to claim 6, wherein the information about the reference signal includes at least one of information about the number of the virtual antennas, information about resource configuration of the reference signal, and information about a sequence scrambling seed of the reference signal.

* * * * *